United States Patent
Tashiro

(10) Patent No.: US 7,903,273 B2
(45) Date of Patent: Mar. 8, 2011

(54) IMAGE PROCESSING APPARATUS, IMAGE PROCESSING METHOD APPLIED TO THE SAME, IMAGE PROCESSING PROGRAM FOR IMPLEMENTING THE METHOD, AND STORAGE MEDIUM STORING THE PROGRAM

(75) Inventor: Hirohiko Tashiro, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1280 days.

(21) Appl. No.: 11/429,405

(22) Filed: May 5, 2006

(65) Prior Publication Data

US 2006/0250632 A1   Nov. 9, 2006

(30) Foreign Application Priority Data

May 6, 2005   (JP) .................................. 2005-135352

(51) Int. Cl.
G06F 3/12   (2006.01)
G06K 15/00   (2006.01)

(52) U.S. Cl. ...................... 358/1.15; 358/1.13; 358/1.18; 358/1.14

(58) Field of Classification Search .................. 358/1.14, 358/1.15, 1.13, 1.1, 1.6, 1.9, 1.18, 400, 401, 358/407, 468, 434, 406, 444; 347/2, 3, 5, 14, 23; 399/1, 8, 9, 10, 11; 715/273, 274, 700

See application file for complete search history.

(56) References Cited

U.S. PATENT DOCUMENTS 5,363,204 A * 11/1994 Millman ...................... 358/406
5,734,804 A * 3/1998 Bergner ...................... 358/1.14

FOREIGN PATENT DOCUMENTS

| JP | 10-198231 A | 7/1998 |
| JP | 2000-194468 A | 7/2000 |
| JP | 2001-282501 A | 10/2001 |
| JP | 2002-221877 A | 8/2002 |

* cited by examiner

Primary Examiner — Dov Popovici

(74) Attorney, Agent, or Firm — Rossi, Kimms & McDowell LLP

(57) ABSTRACT

An image processing apparatus that is capable of displaying an operating manual so as to conform to a machine configuration, option settings and/or customization by a user. A screen ID corresponding to an apparatus function based on functions that can be performed on a copying machine 1001 is obtained. A manual screen using image corresponding to the obtained screen ID is composed. The composed manual screen is displayed on a display device.

13 Claims, 12 Drawing Sheets

*FIG. 7*

| FUNCTION | SCREEN NAME | SCREEN ID |
|---|---|---|
| COPY | DEFAULT SCREEN | IDC-001 |
| | ZOOM | IDC-002 |
| | SORT | IDC-003 |
| | STAPLE | IDC-004 |
| | DOUBLE-SIDED | IDC-005 |
| | DETAILS ON DOUBLE-SIDED | IDC-006 |
| | SPECIAL MODE 1 | IDC-007 |
| | SPECIAL MODE 2 | IDC-008 |
| | ・・・ | IDC-N |
| BOX | DEFAULT SCREEN | IDB-001 |
| | SCAN ORIGINAL | IDB-002 |
| | ・・・ | IDB-N |
| SEND | DEFAULT SCREEN | IDS-001 |
| | SCAN ORIGINAL | IDS-002 |
| | ・・・ | IDS-N |
| ・・・ | ・・・ | ・・・ |

*FIG. 11*

| MAJOR FUNCTION | SUB-FUNCTION | MANUAL SCREEN ID | SCREEN ID | FILE NAME |
|---|---|---|---|---|
| COPY | MAGNIFICATION/ REDUCTION | MC-001 | IDC-001 | IDC-001.jpg |
| | | | IDC-002 | IDC-002.jpg |
| | SORT | MC-002 | IDC-001 | IDC-001.jpg |
| | | | IDC-003 | IDC-003.jpg |
| | DOUBLE-SIDED COPY | MC-003 | IDC-001 | IDC-001.jpg |
| | | | IDC-005 | IDC-005.jpg |
| | | | IDC-006 | IDC-006.jpg |
| | IMAGE PROCESSING | MC-004 | ・・・ | ・・・ |
| | COVER SHEET ATTACHMENT | MC-005 | ・・・ | ・・・ |
| | IMAGE SHIFT | MC-006 | ・・・ | ・・・ |
| | COPY RESERVATION | MC-007 | ・・・ | ・・・ |
| | ・・・ | | ・・・ | ・・・ |
| TRANSMIT | ・・・ | | ・・・ | ・・・ |
| | ・・・ | | ・・・ | ・・・ |
| FAX | ・・・ | | ・・・ | ・・・ |
| | ・・・ | | ・・・ | ・・・ |
| SAVE | ・・・ | | ・・・ | ・・・ |
| | ・・・ | | ・・・ | ・・・ |
| OTHER | ・・・ | | ・・・ | ・・・ |
| | ・・・ | | ・・・ | ・・・ |

IMAGE PROCESSING APPARATUS, IMAGE PROCESSING METHOD APPLIED TO THE SAME, IMAGE PROCESSING PROGRAM FOR IMPLEMENTING THE METHOD, AND STORAGE MEDIUM STORING THE PROGRAM

BACKGROUND OF THE INVENTION

1. Field of the Invention

The present invention relates to an image processing apparatus, an image processing method applied to the same, an image processing program for implementing the method, and a storage medium storing the program. In particular, the present invention relates to an image processing apparatus such as a digital multi-function machine that displays help information relating to an operating manual for machine functions, an image processing method applied to the apparatus, an image processing program for implementing the method, and a storage medium storing the program.

2. Description of the Related Art

In recent years, digital multi-function machines are provided with a wide range of functions such as a copying function, a printing function, a facsimile transmission function, a transmission function, and a linkage function with the Internet. As a result, an operating manual showing how to operate such machine functions tends to be of a large volume.

It can thus take a long time to find an explanation of operation of a desired machine function from the operating manual. When any desired volume or set of volumes of the operating manual is not at hand, users cannot quickly know how to operate the desired machine function.

Some multi-function machines are therefore designed to provide a guide function to display on their operating screen an operating manual relating to machine functions. However, the amount of memory available for the guide function is typically limited, thus the operating manual to be displayed must be simplified in order to display a variety of machine functions available on the multi-function machine. Consequently, users cannot sometimes carry out a desired machine function even with reference to the operating manual displayed on the operating screen based on the guide function. This is because the displayed manual is too simple and does not include sufficient explanation of operations of the desired machine function.

To obviate such a situation, an attempt has been made to digitize an operating manual providing sufficient explanations of operations of machine functions and cause the digitized manual to be stored in a hard disk of a multi-function machine or distributed from an external server to the multi-function machine, so that the manual can be viewed on the operating panel of the multi-function machine (see Japanese Laid-Open Patent Publication (Kokai) No. 2001-282501, for example). This enables users to quickly know in sufficient detail how to operate a desired machine function even if no operating manual is at hand. Further, a multi-function machine having a large-sized screen on the operating panel improves visibility of an operating manual listing displayed on the operating panel.

In general, however, images used for displaying the operating manual on the operating panel are designed to conform to the originally envisaged machine configuration or option settings of the multi-function machine, the displayed operating manual sometimes does not conform to a machine environment configured for an individual user. For instance, when a user is not authorized to use the transmission function of the multi-function machine, the transmission function is masked and is not displayed on the operating panel in actual use of the machine. Nevertheless, the operating manual displayed is the same as that for users authorized to use the transmission function. Undesirably, the displayed manual includes unnecessary explanations of the transmission function.

In an ordinary multi-function machine, an individual user can install a favorite key for calling out special function frequently used by the user on the screen of the multi-function machine. However, the user-customized favorite key is not shown in the operating manual, and thus screen contents actually displayed in the multi-function machine do not coincide with those shown in the operating manual, which can confuse the user.

SUMMARY OF THE INVENTION

It is an object of the present invention to provide an image processing apparatus that is capable of displaying an operating manual so as to conform to a machine configuration, option settings and/or customization by a user, an image processing method applied to the apparatus, an image processing program for implementing the method, and a storage medium that stores the program thereon.

To attain the above object, in a first aspect of the present invention, there is provided an image processing apparatus comprising an obtaining device that obtains at least one screen indicator corresponding to an apparatus function based on functions that can be performed on the image processing apparatus, a composition device that composes a manual screen using at least one image corresponding to the obtained screen indicator, and a manual display device that displays the composed manual screen on a display device.

Preferably, the image processing apparatus comprises a storage device that stores images so as to correspond to screen indicators, and the composition device composes the manual screen based on at least one of the images stored in the storage device.

Preferably, the composition device composes the manual screen based on at least one function that is available to a user who requests the display of the manual screen.

Preferably, the composition device composes the manual screen in a mark-up language.

Preferably, the image processing apparatus comprises a transmission device that transmits the manual screen composed by the composition device.

To attain the above object, in a second aspect of the present invention, there is provided an image processing method comprising an obtaining step of obtaining at least one screen indicator corresponding to an apparatus function of an image processing apparatus, a composition step of composing a manual screen using at least one image corresponding to the obtained screen indicator, and a manual display step of displaying the composed manual screen on a display device.

Preferably, in the composition step, at least one of images stored in the image processing apparatus is extracted based on the image indicator and the manual screen is composed based on the extracted image.

Alternatively, in the composition step, the manual screen is composed based on at least one function that is available to a user who requests the display of the manual screen.

Preferably, in the composition step, the manual screen is composed in a mark-up language.

Preferably, the manual display step is carried out on an operating screen of the image processing apparatus that implements the apparatus function.

Alternatively, the manual display step is carried out on an information processing terminal that is connected via a network to the image processing apparatus that implements the apparatus function.

To attain the above object, in a third aspect of the invention, there is provided a computer-readable image processing program comprising an obtaining module that obtains at least one screen indicator corresponding to an apparatus function of an image processing apparatus, a composition module that composes a manual screen using at least one image corresponding to the obtained screen indicator, and a manual display module that displays the composed manual screen on a display device.

The above and other objects, features, and advantages of the invention will become more apparent from the following detailed description taken in conjunction with the accompanying drawings.

BRIEF DESCRIPTION OF THE DRAWINGS

FIG. 7 is a diagram showing an example of a table containing screen IDs assigned to screen bitmap data that is displayed when each function tab in FIG. 5 is pressed;

FIG. 11 is a diagram showing an example of a management table used for displaying manual contents in the contents display area in FIG. 10.

DETAILED DESCRIPTION OF THE PREFERRED EMBODIMENTS

The present invention will now be described in detail below with reference to the drawings showing a preferred embodiment thereof.

Figure 1:
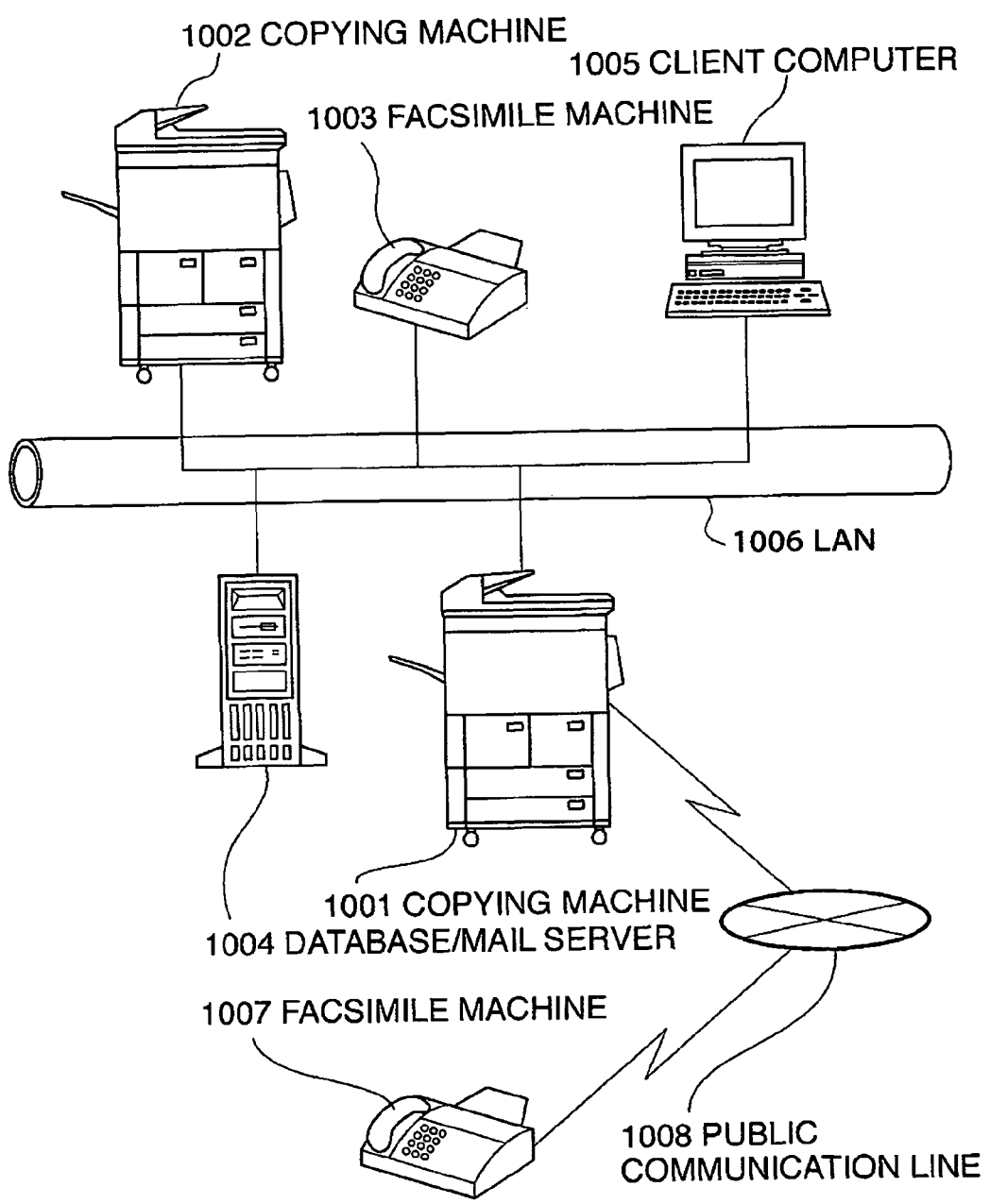
FIG. 1 is a diagram showing the network configuration of a system including a multi-function machine as an image processing apparatus according to an embodiment of the present invention.

FIG. 1 is a diagram showing the network configuration of a system including a multi-function machine as the image processing apparatus according to an embodiment of the present invention.

As shown in FIG. 1, a copying machine 1001 as a multi-function machine that has a data transmission and reception function in addition to a copying function is connected to a LAN 1006 such as an Ethernet (registered trademark), to which are also connected a copying machine 1002 having functions equivalent to those of the copying machine 1001, a facsimile machine 1003, a database/mail server 1004, and a client computer 1005. Further, the copying machine 1001 is connected to a public communication line 1008 together with a facsimile machine 1007. The copying machine 1001 is provided with a copying function and a facsimile transmission function, as well as a scanning function of reading original images and a data transmission function of transmitting image data obtained by the scanning function to devices on the LAN 1006. The copying machine 1001 conforms to the PDL (Page Description Language), so that it can receive PDL data from a computer connected to the LAN 1006 and print the data. The copying machine 1001 is capable of storing images read by itself and PDL data sent from computers connected to the LAN 1006 in a designated box area in a hard disk drive (HDD) 2004 (FIG. 2) of the copying machine 1001, as well as capable of printing the images stored in the box area.

The copying machine 1001 is also capable of receiving, via the LAN 1006, image data read by the copying machine 1002 and storing the received data in the HDD 2004 of the copying machine 1001 and/or printing out the same. Further, the copying machine 1001 is capable of receiving image data from the database/mail server 1004 via the client computer 1005 and the LAN 1006, and storing the image data in the copying machine 1001 and/or printing out the same. The facsimile machine 1003 is capable of receiving image data read by the copying machine 1001 via the LAN 1006 and transmitting the received image data by facsimile transmission.

The database/mail server 1004 is a server apparatus provided with a function of receiving image data read by the copying machine 1001, via the LAN 1006, and storing the received image data for a database, and a function of transmitting the received image data as an electronic mail.

The client computer 1005 is capable of accessing the database/mail server 1004 to acquire desired data from the database/mail server 1004, and displaying the data, as well as capable of receiving image data read by the copying machine 1001, via the LAN 1006, and processing/editing the received image data.

The facsimile machine 1007 is capable of receiving image data read by the copying machine 1001 via the public communication line 1008 and printing out the received image data.

Figure 2:
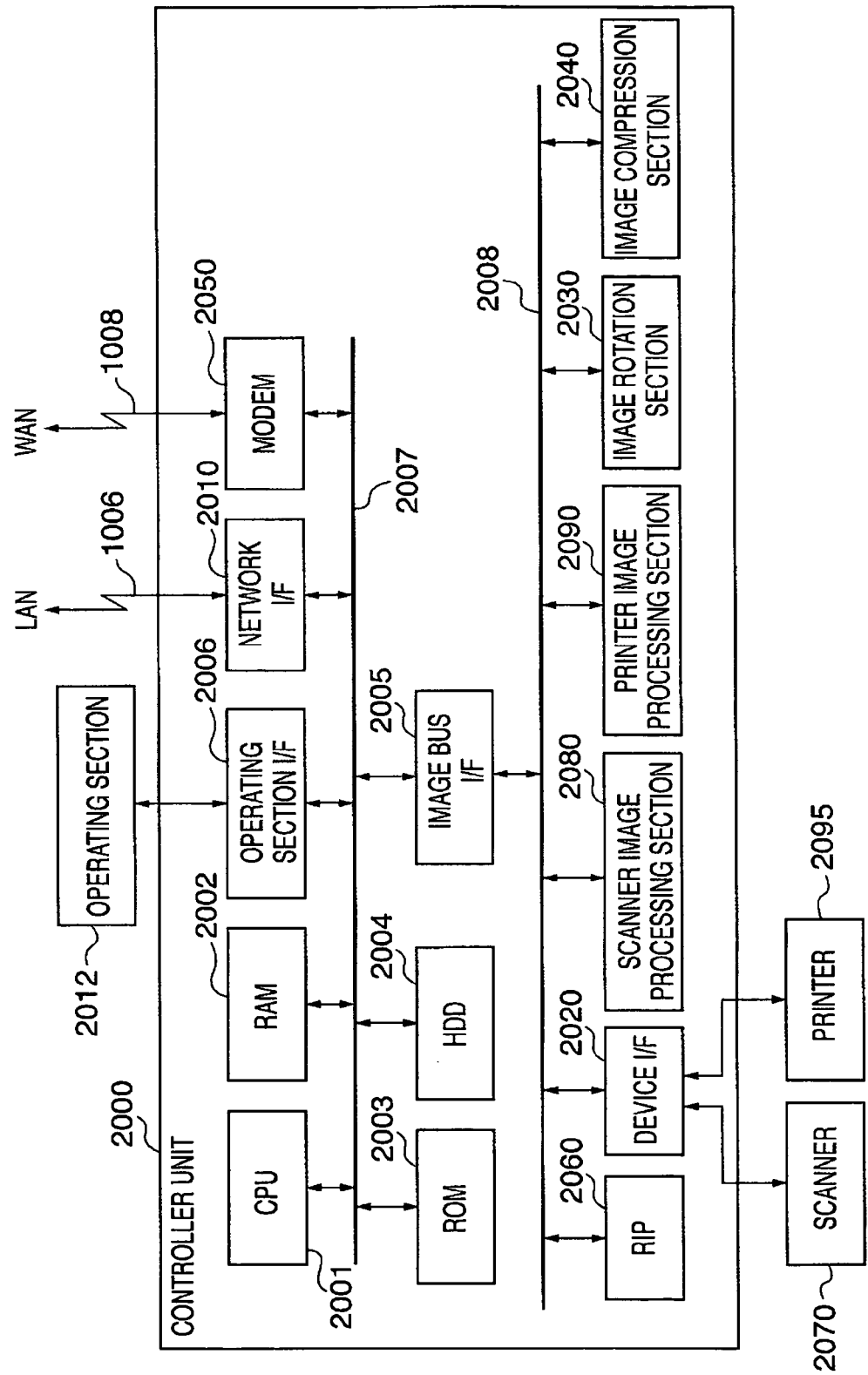
FIG. 2 is a block diagram showing the configuration of essential parts of the multi-function machine in FIG. 1.

FIG. 2 is a block diagram showing the configuration of essential parts of the copying machine 1001 in FIG. 1.

The copying machine 1001 includes a controller unit 2000. Connected to the controller unit 2000 is a scanner 2070 as an image input device and a printer 2095 as an image output device, as well as an operating section 2012 provided with a touch panel. The controller unit 2000 provides control for realizing a copying function of printing out image data read by the scanner 2070, using the printer 2095, as well as control for input and output of image information and device information to and from the LAN 1006 connected to the copying machine 1001 and public communication line 1008 connected to the copying machine 1001 and forming e.g. a WAN (Wide Area Network).

More specifically, the controller unit 2000 includes a CPU 2001, which starts up an operating system (OS) by a boot program stored in a ROM 2003, and executes application programs stored in the HDD 2004 on the OS to thereby carry out various operations. A RAM 2002 is used as a work area for the CPU 2001. The RAM 2002 is used by the CPU 2001 not only as the work area, but also as an image memory area for temporarily storing image data. The HDD 2004 stores the above-mentioned application programs, image data, and manual contents, described in detail hereinafter.

Connected to the CPU 2001 via a system bus 2007 are not only the ROM 2003 and the RAM 2002 but also an operating section I/F (operating section interface) 2006, a network I/F (network interface) 2010, a modem 2050, and an image bus I/F (image bus interface) 2005.

The operating section I/F 2006 provides interface for communication with the operating section 2012, and image data to be displayed on the operating section 2012 is output to the operating section 2012. Further, the operating section I/F 2006 transfers data input by a user via the operating section 2012 to the CPU 2001.

The network I/F 2010 is connected to the LAN 1006 to transmit and receive information to and from devices on the LAN 1006 via the LAN 1006. The modem 2050 is connected to the public communication line 1008 to transmit and receive information via the public communication line 1008.

The image bus I/F 2005 is a bus bridge that connects the system bus 2007 with an image bus 2008 that is for use in high-speed transfer of image data, and performs conversion of data format. The image bus 2008 is implemented by a PCI bus or an IEEE 1394. On the image bus 2008, there are provided a raster image processor (hereinafter referred to as "the RIP") 2060, a device I/F 2020, a scanner image processing section 2080, a printer image processing section 2090, an image rotation section 2030, and an image compression section 2040.

The RIP 2060 is a processor that expands PDL data into a bitmap image. The device I/F 2020 is connected to the scanner 2070 and printer 2095, and performs synchronous-to-asynchronous or asynchronous-to-synchronous conversion of image data. The scanner image processing section 2080 corrects, manipulates, and edits input image data. The printer image processing section 2090 performs correction, resolution conversion, etc. of image data to be printed out, so as for the image data to conform to the printer 2095. The image rotation section 2030 rotates image data. The image compression section 2040 compresses multi-valued image data into JPEG data, and binary image data into JBIG, MMR, or MH-formatted data, as well as performs expansion of the compressed data.

Next, a description will be given of the hardware configuration of the scanner 2070 and printer 2095 with reference to FIG. 3.

Figure 3:
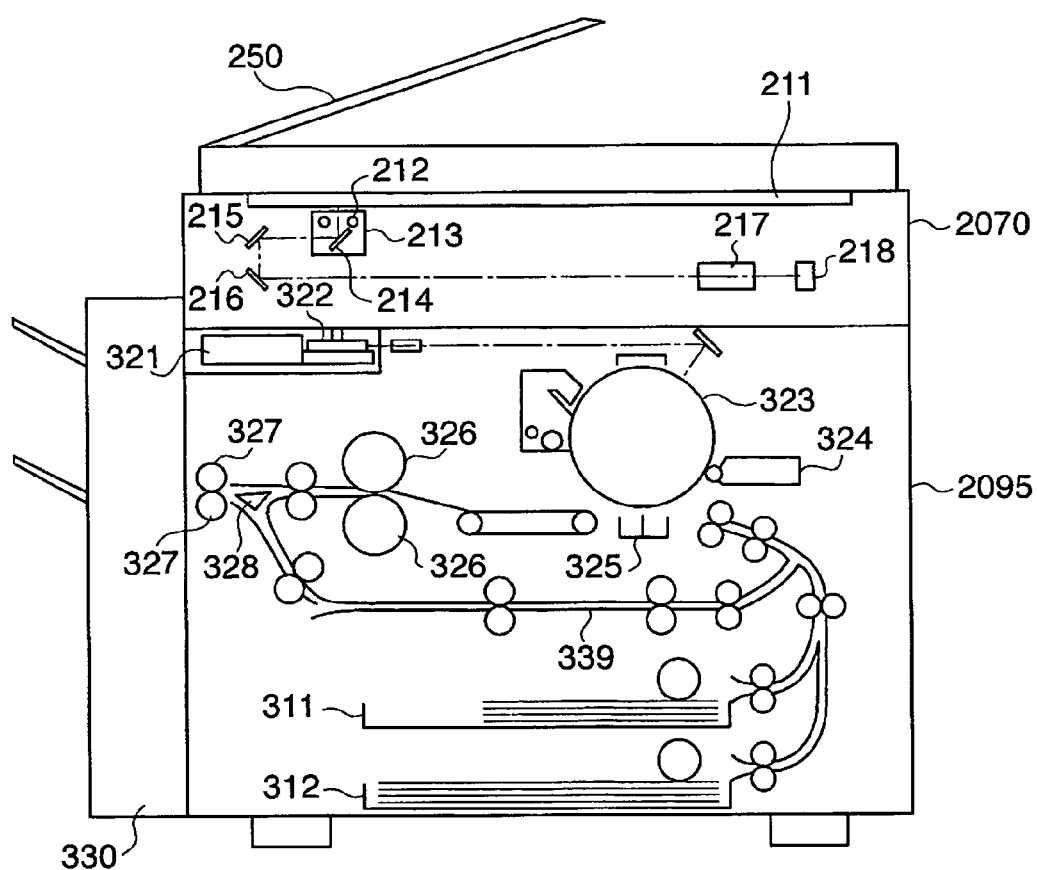
FIG. 3 is a side cross-sectional view showing the hardware configuration of a scanner and a printer appearing in FIG. 2.

FIG. 3 is a side cross-sectional view showing the hardware configuration of the scanner 2070 and printer 2095 in FIG. 2.

The scanner 2070 and the printer 2095 are integrally configured as shown in FIG. 3. The scanner 2070 has an original sheet feeding unit 250 provided thereon. In the original sheet feeding unit 250, originals are sequentially fed one by one from the leading page onto a platen glass 211, and whenever an operation of reading an original is completed, the original is discharged from the platen glass 211 onto a discharge tray, not shown. When the original is fed onto the platen glass 211, the scanner 2070 turns on a lamp 212 and causes a moving unit 213 to start moving. By the motion of the moving unit 213, scanning is performed to read the original on the platen glass 211. During the scanning, reflected light from the original is guided through mirrors 214, 215, and 216, and a lens 217 to a CCD 218 as an image sensor, and the image on the original is formed on the image pick-up surface of the CCD 218. The CCD 218 converts the image formed on the image pick-up surface into an electric signal. The electric signal is subjected to predetermined processing, followed by being input to a control device, not shown.

The printer 2095 is provided with a laser driver 321. The laser driver 321 drives a laser emission section 322 based on the image data input from the control device. The laser emission section 322 generates and emits a laser beam according to the image data, which is irradiated onto a photosensitive drum 323 to scan the same. On the photosensitive drum 323, an electrostatic latent image is formed according to the irradiated laser beam, and this electrostatic latent image is visualized as a toner image by toner supplied from a developing device 324. In timing synchronous with the irradiation of the laser beam, a recording sheet is fed from one of cassettes 311 and 312 into a space between the photosensitive drum 323 and a transfer section 325 through a predetermined conveying passage, and the toner image on the photosensitive drum 323 is transferred onto the recording sheet fed by the transfer section 325.

The recording sheet having the toner image transferred thereon is conveyed by a conveyer belt to a fixing roller pair 326 formed by a heating roller and a pressing roller. The fixing roller pair 326 fixes the toner image on the recording sheet by heating the recording sheet under pressure. After passing through the fixing roller pair 326, the recording sheet is discharged into a discharge unit 330 by a discharge roller pair 327. The discharge unit 330 is implemented by a sheet processing apparatus capable of performing post-processing, such as sorting and stapling.

When the copying machine 1001 is set to a double-sided printing mode, the recording sheet is conveyed to the discharge roller pair 327, and then the direction of rotation of the discharge roller pair 327 is reversed such that the recording sheet is guided to a re-feeding conveying passage 339 by a flapper 328. The recording sheet guided to the re-feeding conveying passage 339 is re-fed to the space between the photosensitive drum 323 and the transfer section 325 in the same timing as described above, whereby a toner image is transferred onto the back side of the recording sheet.

Figure 4:
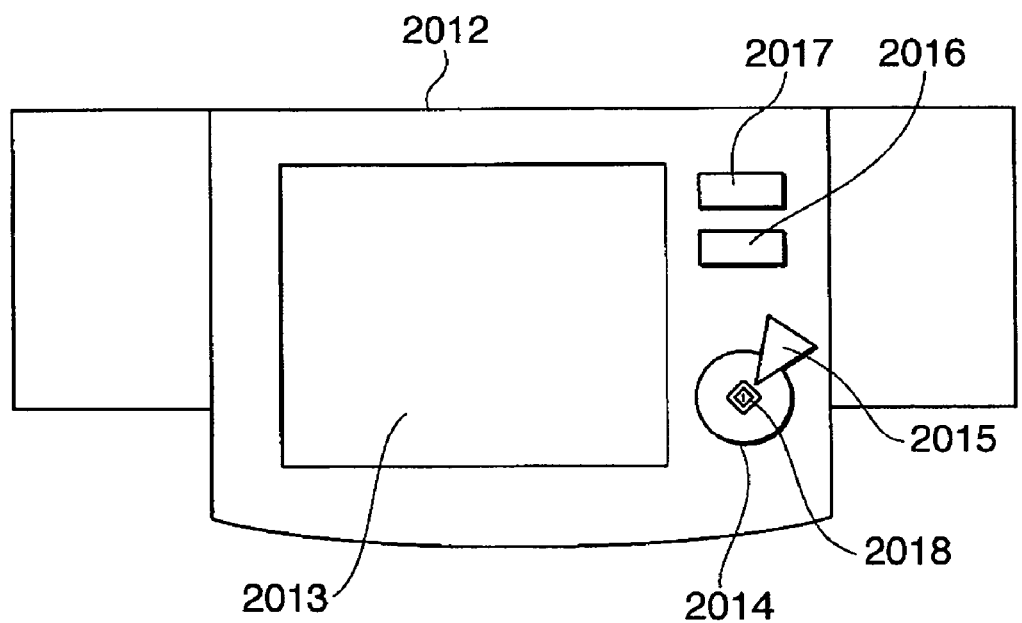
FIG. 4 is a plan view showing the arrangement of an operating section appearing in FIG. 2.

FIG. 4 is a plan view showing the arrangement of the operating section 2012 appearing in FIG. 2.

In FIG. 4, a LCD display section 2013 is comprised of a LCD and a touch panel sheet attached thereto. The LCD display section 2013 displays an operating screen for the copying machine 1001, and when a touch key displayed on the screen is pressed, the LCD display section 2013 transmits position information of the touch key to the CPU 2001 of the controller unit 2000. A start key 2014 is used e.g. for starting an operation of reading an original image. In the center of the start key 2014, there is provided a two-color LED 2018 which emits a green light or a red light to indicate whether or not a function set by pressing the start key 2014 is available. A stop key 2015 is operated to stop a current operation. An ID key 2016 is used to enter the user ID of a user. A reset key 2017 is used to initialize settings entered via the operating section 2012.

Figure 5:
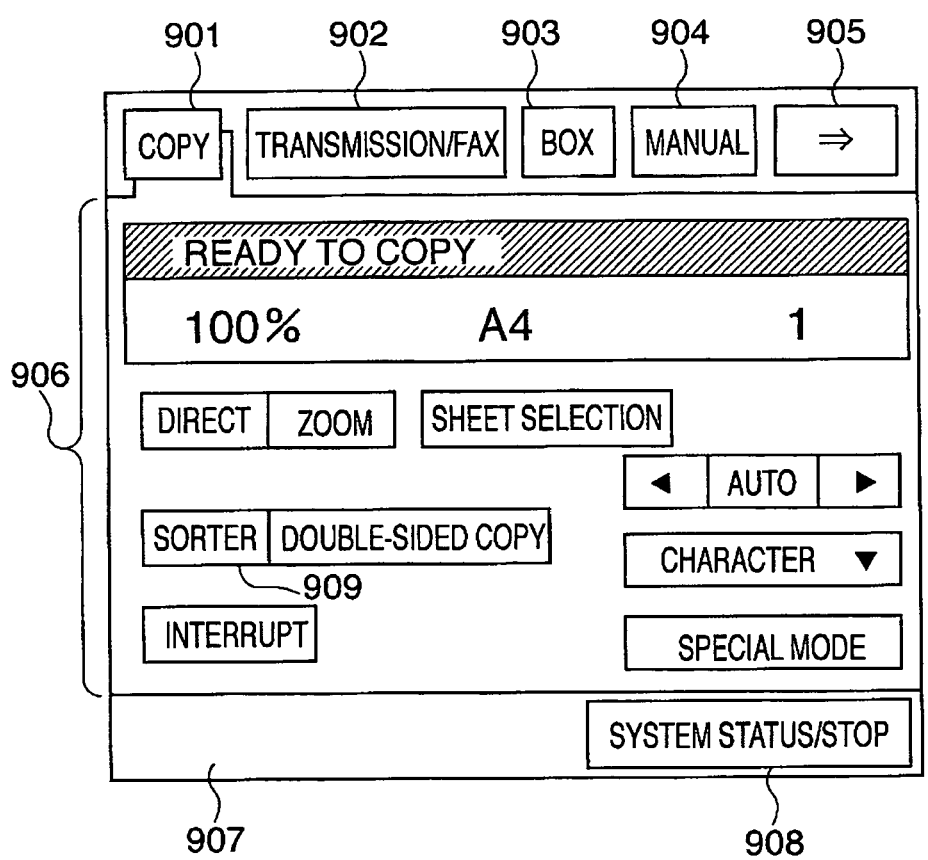
FIG. 5 is a diagram showing an example of an operating screen displayed on the operating section in FIG. 2.

FIG. 5 is a diagram showing an example of an operating screen displayed on the operating section 2012 in FIG. 2.

As shown in FIG. 5, in the uppermost part of the operating screen on the operating section 2012, function tabs are displayed for use as touch keys for selecting one of various functions provided by the copying machine 1001. These function tabs include a copy tab 901, a transmission/fax tab 902, a box tab 903, a manual tab 904, and a right arrow button 905, for example. FIG. 5 shows an initial screen for making the copying function-related settings, which is displayed when the copy tab 901 is pressed.

Display associated with the copying function is provided in an area 906. In a top portion of the area 906, a status message relating to the copying function such as "Ready to copy" is displayed. In a portion immediately below the top portion, a magnification/reduction ratio, a selected sheet feed cassette, and the number of copies are displayed. In a portion further below, as touch keys for the copying function-related settings, there are displayed a direct key, a zoom key, a sheet selection key, a sorter key, a double-sided printing key, an interrupt key, a character key, a left arrow key for adjustment of reducing print density, a right arrow key for adjustment of increasing print density, an auto key for automatic adjustment of print density, and a special mode key. Screens for displaying items of copying function-related settings that cannot be displayed on the initial screen are hierarchically displayed in the area 906 in response to pressing of the special mode key.

A status display area 907 displays a status of the copying machine 1001. For example, an alarm message indicating occurrence of jamming, or a status message indicating that printing is being carried out in a PDL format is displayed. Further, in the status display area 907, a system status/stop key 908 is displayed. By pressing the system status/stop key 908, it is possible to stop or abort a job that is currently in process. If necessary, it is possible to display a screen, not shown, for displaying device information on the copying machine 1001 or a screen, not shown, for displaying the progress of a print job currently executed.

When the transmission/fax tab 902 is pressed, a setup screen, not shown, is displayed for transmitting an image read by the copying machine 1001 to an apparatus on the LAN 1006 by e-mail or FTP transmission, or by facsimile transmission using the public communication line 1008.

When the box tab 903 is pressed, a setup screen, not shown, is displayed for storing an image read by the copying machine 1001 in the box area of the HDD 2004, or for designating image data stored in the box area to print out the same or transmit the same to an apparatus on the LAN 1006.

The case where the manual tab 904 is pressed will be described below with respect to FIG. 9.

In the case the copying machine 1001 is provided with five or more functions, the right arrow key 905 is displayed to the right of the four function tabs 901 to 904, i.e., the copy, transmission/fax, box, and manual tabs, and when the right arrow key 905 is pressed, additional function tabs are displayed.

Figure 6:
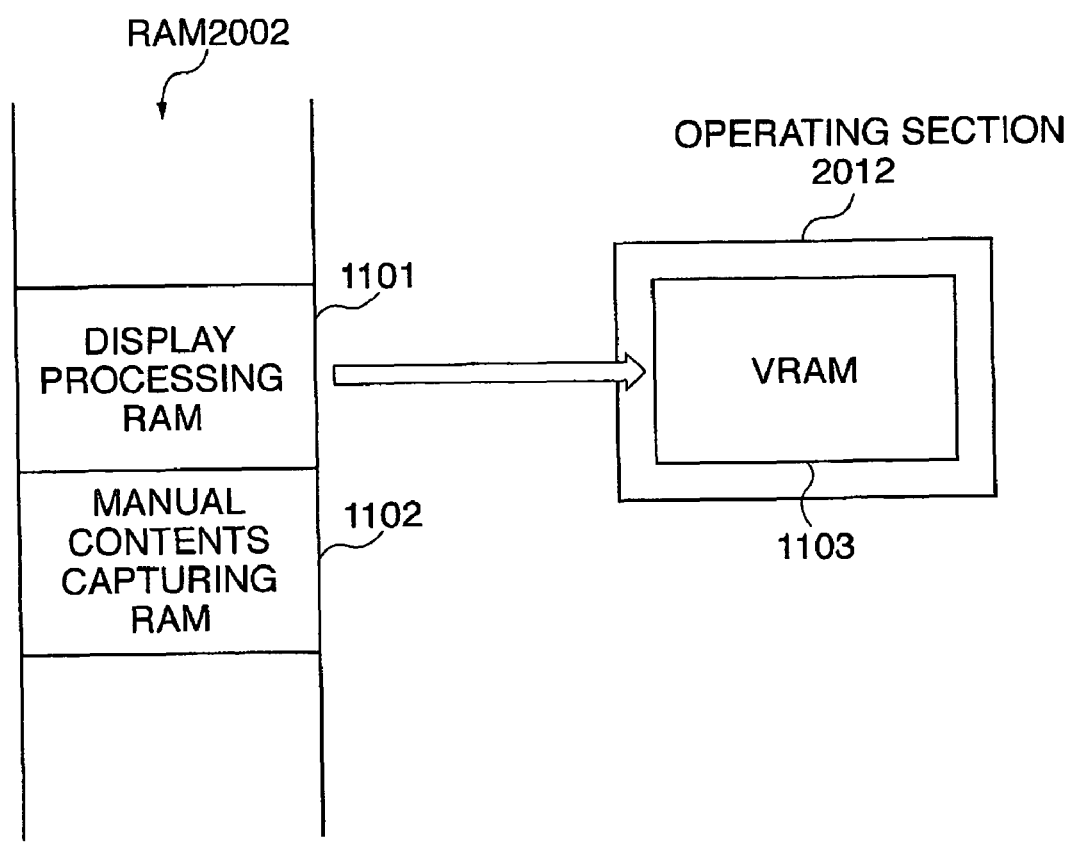
FIG. 6 is a diagram useful in explaining an area in the RAM in FIG. 2.

Screen bitmap data used to display an image that shows an apparatus function corresponding to the pressed function tab is generated as temporary data in a display processing RAM area 1101 of the RAM 2002 in FIG. 2 (FIG. 6).

Figure 8:
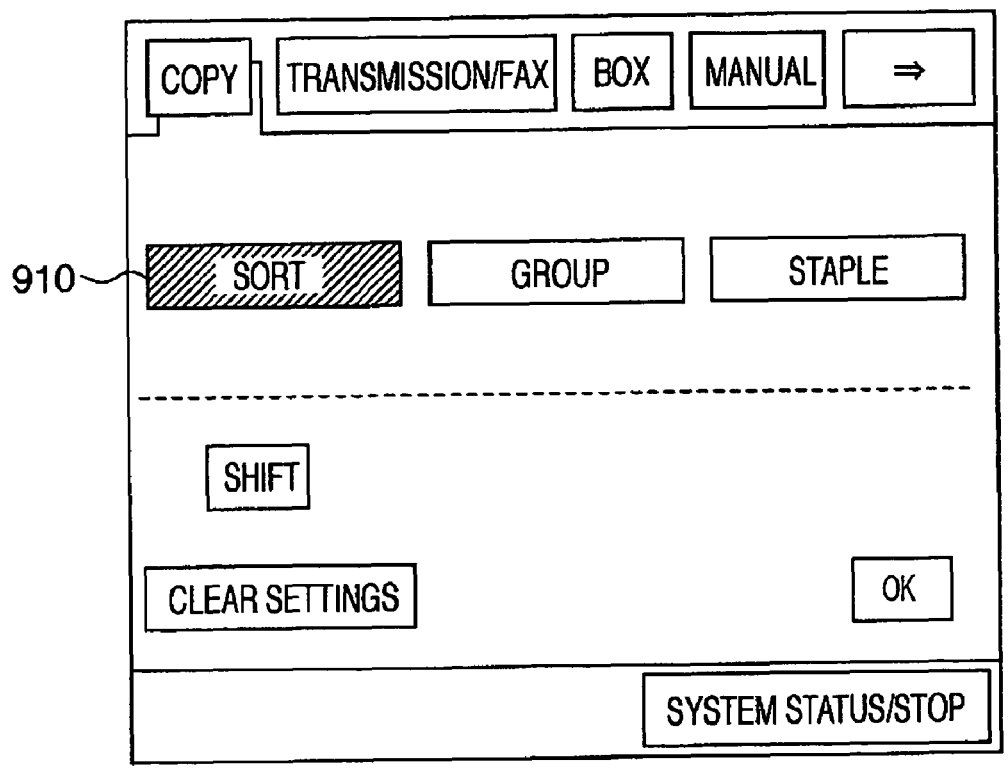
FIG. 8 is a diagram showing a screen bitmap that is displayed when a "sorter" key in FIG. 5 is pressed.

As shown in FIG. 7, screen bitmaps (e.g., screen names such as "default screen" and "magnification/reduction ratio") are each assigned a screen ID (screen indicator), each bitmap being displayed when a corresponding one of the function tabs is pressed. For example, a screen bitmap shown in FIG. 8 that is displayed when the "sorter" key 909 is pressed (screen name "Sort") is assigned screen ID "IDC-003." Screen composition information, such as the number of keys to be displayed in the screen, text information on and types and coordinates of respective ones of the keys, and inversion information for highlighting keys, is managed in association with screen IDs. Based on the screen composition information, screen bitmap data is generated in the display processing RAM area 1101. The screen bitmap data generated in the display processing RAM area 1101 is transferred to a VRAM 1103 (FIG. 6) in the operating section 2012 in accordance with instructions from the CPU 2001, and a screen that is based on the screen bitmap data transferred to the VRAM 1103 is displayed on the operating section 2012. The screen bitmap data includes an image of a screen to be actually displayed on the operating section 2012 and an image showing the appearance of the apparatus.

A manual display screen shown on the operating section 2012 will be now described.

Figure 9:
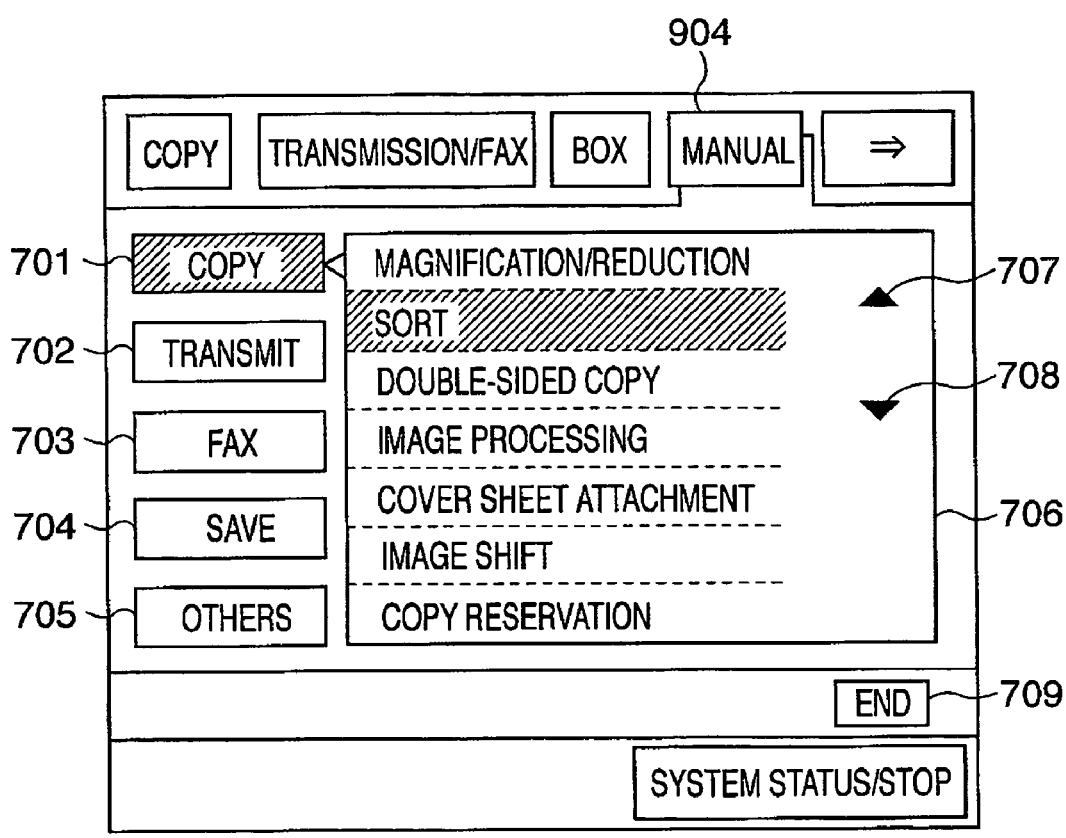
FIG. 9 is a diagram showing a menu screen that is displayed on the operating section in FIG. 2.

FIG. 9 is a diagram showing a menu screen that is displayed on the operating section 2012 in FIG. 2.

In FIG. 9, the menu screen displayed on the operating section 2012 is a screen for displaying an operating manual when the manual tab 904 is pressed. The menu screen is comprised of selection keys respectively corresponding to major items of the manual and including a "copy" key 701, a "transmit" key 702, a "fax" key 703, a "save" key 704 and "other" key 705; and an area 706 in which listing of sub-items associated with a selected one of the major items is displayed. By pressing a scroll up key 707 and a scroll down key 708, it is possible to scroll the screen to display a list of sub-items that is not currently displayed in the area 706. Display/non-display of each of the major items is changed according to functions currently available on the copying machine 1001 or functions that user currently operating the copying machine 1001 is authorized to use. The same applies to the sub-items.

For example, when the "copy" key 701 is pressed, sub-items associated with the major item "Copy" such as "magnification/reduction", "sort", "double-sided copy", "image processing", "cover sheet attachment", "image shift", and "copy reservation" are displayed in the area 706.

Similarly, when the "transmit" key 702 is pressed, a list of sub-items related to the major item "Transmit" is displayed in the area 706, when the "fax" key 703 is pressed, a list of sub-items related to the major item "Fax" is displayed in the area 706, when the "save" key 704 is pressed, a list of sub-items related to the major item "Save" is displayed in the area 706, and when the "other" key 705 is pressed, a list of sub-items related to the major item "Other" is displayed in the area 706.

When any of the sub-items displayed in the area 706 is selected by touching it, a screen appears that displays manual contents relating to the selected sub-item. For example, when the sub-item "Sort" is selected, a screen appears that displays manual contents relating to the sub-item "Sort".

When an end key 709 is pressed, the menu screen for manual display is closed.

Figure 10:
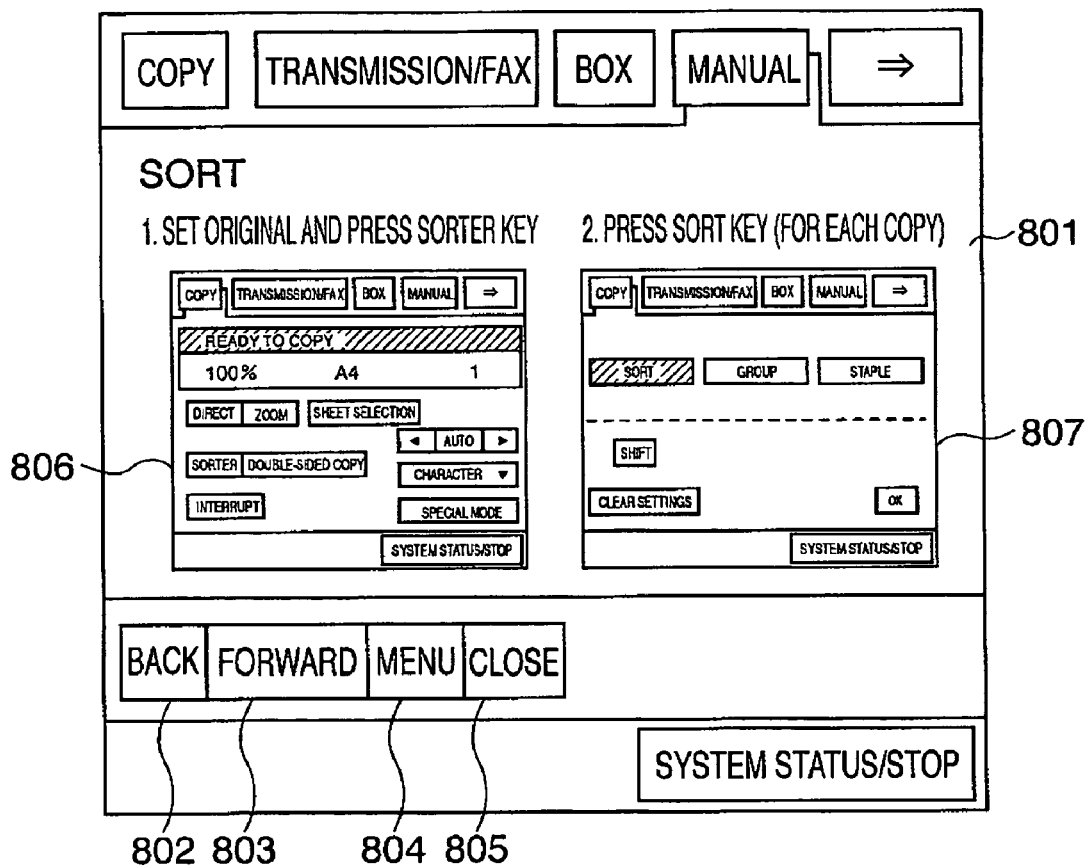
FIG. 10 is a diagram showing a screen which appears when the sub-item "sort" displayed in the area in FIG. 9 is selected.

FIG. 10 is a diagram showing a screen which appears when the sub-item "Sort" displayed in the area in FIG. 9 is selected.

In FIG. 10, a built-in browser program stored in the ROM 2003 for implementing a web browsing function is activated, and manual contents associated with the sub-item "Sort" and stored in the HDD 2004 (FIG. 2) as an HTML (mark-up language) document are displayed in a contents display area 801. When the manual is continued to the next page, the next page can be displayed by pressing a "forward" key 803, and the previous page can be displayed by pressing a "back" key 802. Further, by pressing a "menu" key 804, the user can end the browser program to display the menu screen (FIG. 9), and by pressing a "close" key 805, the user can end the browser program and close the screen showing the manual contents. It is noted that, in connection with the function tabs 901 to 905, manual contents even for the same function may be displayed or not displayed depending on functions currently available on the copying machine 1001 or the user operating the copying machine 1001. Further, when the user configures his/her own "favorite" key, the user customization is reflected in the display of manual contents concerned.

FIG. 11 is a diagram showing an example of a management table used for displaying manual contents in the contents display area in FIG. 10.

In FIG. 11, the sub-item "Sort" which is associated with the major item "Copy" is assigned a manual screen ID "MC-002", for example. To display manual contents associated with the sub-item "Sort", a screen 806 (FIG. 10) corresponding to screen ID "IDC-001" and a screen 807 (FIG. 10)

corresponding to screen ID "IDC-003" are needed. File names "IDC-001.jpg" and "IDC-003.jpg" specifying the screens 806 and 807 are designated in advance in a source file of manual contents.

Similarly, the sub-item "double-sided copy" associated with the major item "Copy" is assigned a manual screen ID "MC-003". To display manual contents relating to the sub-item "Double-sided copy", a screen corresponding to a screen ID "IDC-001", a screen corresponding to a screen ID "IDC-005", and a screen corresponding to a screen ID "IDC-006" are necessary. File names that specify those images are "IDC-001.jpg", "IDC-005.jpg", and "IDC-006.jpg", respectively.

Figure 12:
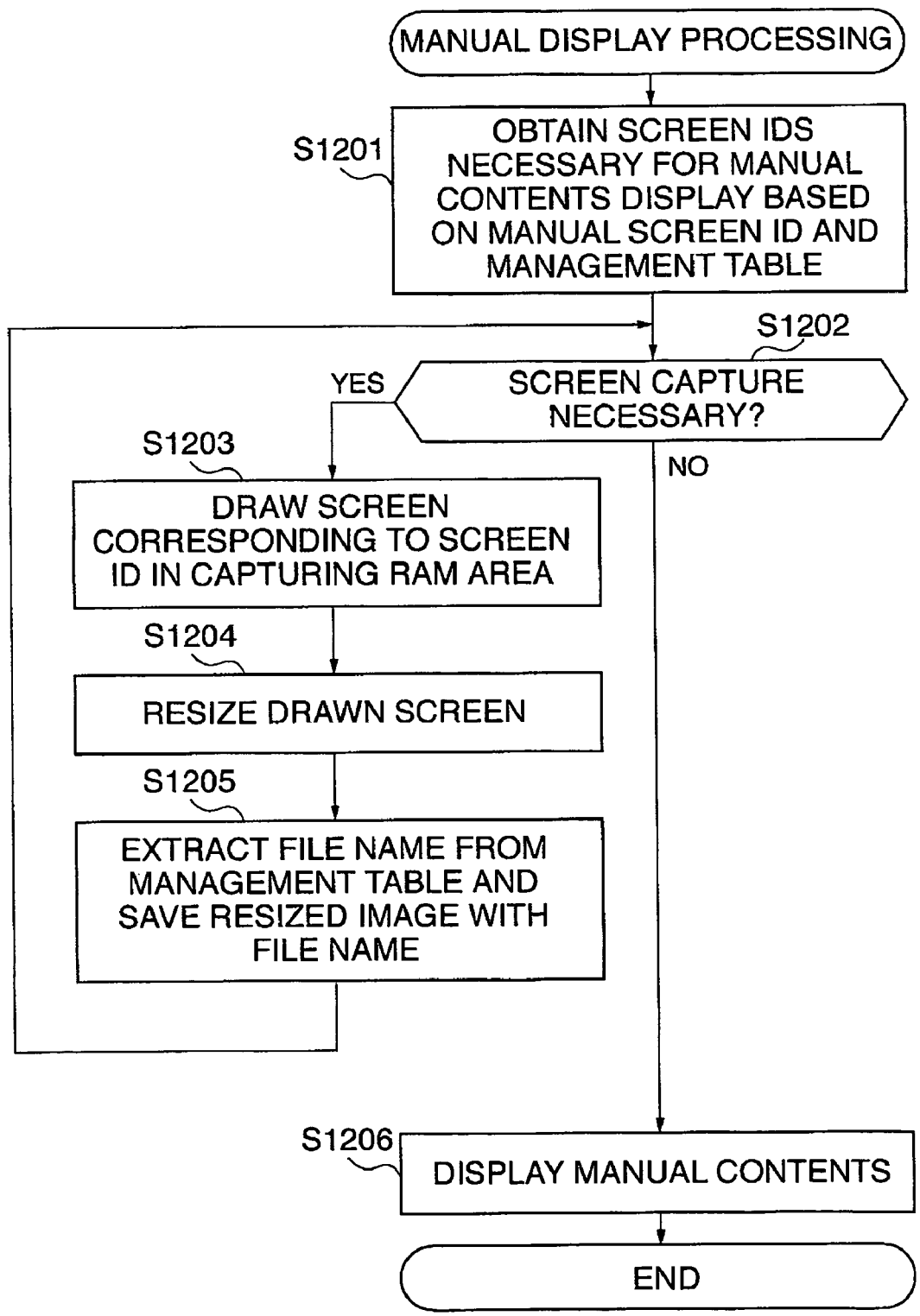
FIG. 12 is a flowchart showing the procedure of manual display processing that is implemented by the multi-function machine in FIG. 1.

FIG. 12 is a flowchart showing the procedure of manual display processing that is implemented by the multi-function machine in FIG. 1.

As described with reference to FIG. 9, when the manual tab 904 and any one of the selection keys 701-705 are pressed, a corresponding one of the major items is selected and the sub-item list is displayed in the area 706. Subsequently, any of the sub-items is selected from the list, whereby display of a manual concerned is requested.

In FIG. 12, when the manual display is requested in this manner, two or more (more generally, one or more) screen IDs for two or more (more generally, one or more) screens that are necessary to display the concerned manual contents are obtained based on the manual screen ID corresponding to a combination of the selected major item and the selected sub-item and the management table (FIG. 11) showing the relationship between manual screen IDs and screen ID (step S1201).

It should be noted that if the apparatus function specified by the manual screen ID does not belong to the functions currently available on the copying machine 1001 and available to the user who is presently using the copying machine 1001, then an error process (not shown) is performed.

Then, it is determined whether or not it is necessary to compose (capture) the two or more screens to display the manual contents (step S1202). For example, when the manual screen ID is MC-001, the screen corresponding to the screen ID "IDC-001" and the screen corresponding to the screen ID "IDC-002" need to be composed (captured), thus the procedure proceeds to step S1203.

When it is necessary to compose (capture) the screens to display the manual contents, a screen bitmap corresponding to one (here, a first one) of the screen IDs obtained at step S1201 is created and drawn in the manual contents capturing RAM area 1102 of the RAM 2002 (in which an image corresponding to a screen indicator (screen ID) is stored) (FIG. 6) (step S1203). Then, the drawn screen bitmap is reduced to a screen size suitable for the manual contents by JPEG compression (step S1204), and a file name designating the image is extracted from the management table (FIG. 11), and the resized image is saved with the extracted file name in the area of the HDD 2004 in which the manual contents are stored (step S1205). Then back at step S1202, the procedure from step S1203 to S1205 is repeated until there is no need to compose (capture) any one of the screens to display the manual contents.

When it is not necessary to compose (capture) a screen for displaying the manual contents (e.g. when the manual contents do not include an image of a screen to be displayed on the operating section 2012 or an image showing the appearance of the copying machine 1001), the manual contents are displayed on the operating section 2012 (step S1206), and the procedure terminates.

According to the process shown in FIG. 12, upon manual display, screen bitmaps necessary to display the manual contents are each created and drawn sequentially in the manual contents capturing RAM area 1102, which is a distinct area from the display processing RAM 1101 of the RAM 2002 (step S1203), and the manual contents are displayed using the drawn screen bitmaps (step S1206). The resultant manual display conforms to the machine configuration, option settings, and user customization. This enables the operating screen actually used by the user to coincide with the manual screen in the displayed manual contents. For example, when the user is not authorized to use a transmission function and the operation function for transmission is thus masked on the operating section 2012, the transmission function is also masked in the displayed manual screen. When some keys are customized by the user, the displayed manual screen is made adaptive to the key customization. Thus, the resultant manual display is easier to understand.

In the present embodiment, while the manual contents are displayed on the operating section 2012, the invention is not limited thereto. For example, an HTTP server may be installed in the controller unit 2000 and the manual contents that are stored as an HTML document may be distributed from the server to a display device other than the operating section 2012. In this case, when viewing of the manual contents is requested via a web browser from a personal computer (PC) on the LAN 1006, a screen necessary for displaying the manual contents is composed (captured), is transmitted as an HTML document, and is displayed on the display of the PC.

Further, in the present embodiment, when a desired sub-item is selected from the sub-item list shown in FIG. 9, screens necessary for displaying the manual contents are each composed (captured) in sequence. However, the present invention is not limited thereto. For example, all the screens necessary for displaying the manual contents may be composed (captured) in advance when the copying machine 1001 is turned on. When the major item "Transmit", for instance, is selected, screens needed to display the manual contents associated with the major item "Transmit" may be composed at a time.

In addition, functions available on a multi-function machine may be varied among users or departments. In this case, functions available to a user requesting the manual display may be determined by way of user authentication or department authentication using the operating section 2012 or a user card and the like, and, in conjunction with the authentication, manual contents may be generated so as to conform to the user-available functions.

As has been described, according to the present invention, a manual contents displaying screen is composed of a plurality of screen files and is dynamically created based on currently available functions, it is possible to design the manual display in image processing apparatuses in common not only with machines of the same model but also machines having similar functions, making it possible to reduce development costs. In addition, since there is no need to maintain a plurality of the same screens redundantly, wasteful memory usage is prevented.

If some functions are subsequently added, only screen files for the added functions have to be added so that a version upgrade can be addressed easily.

In the present embodiment, while display of manual contents has been described as an example, the invention is not limited thereto. Rather, the invention can be applied to various fields that involve display of machine configuration such as simple query of currently available functions and display of current internal state of a machine.

The invention is also applicable to various types of machines, other than the above-described multi-function machine, in which available functions vary depending on the way of machine usage by each individual user.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

This application claims the benefit of Japanese Application No. 2005-135352, filed May 6, 2005, which is hereby incorporated by reference herein in its entirety.

What is claimed is:

1. An image processing apparatus which has a plurality of functions, comprising:
a display unit configured to display an operating screen operated by a user to use at least one of the plurality of functions and manual information related to the at least one of the plurality of functions; and
a control unit configured to, if there is no function which is not available to the user, cause the display unit to display manual information including an operating screen indicating that the user can use each of the plurality of functions, and if there is a function which is not available to the user, cause the display unit to display manual information including an operating screen indicating that the user cannot use the function which is not available to the user.

2. The image processing apparatus according to claim 1, further comprising a storage unit configured to store screen information for generating an operating screen operated by the user to use at least one of the plurality of functions; and
a generating unit configured to generate the operating screen included in the manual information in accordance with the screen information stored in the storage unit.

3. The image processing apparatus according to claim 1, wherein the display unit is a touch panel unit.

4. The image processing apparatus according to claim 2, wherein the control unit causes the display unit to display the manual information, including the operating screen being reduced in size, based on the operating screen generated by the generating unit.

5. The image processing apparatus according to claim 1, further comprising
an authenticating unit configured to authenticate the user, wherein the control unit causes, if there is no function which is not available to the user authenticated by the authenticating unit, the display unit to display manual information including an operating screen indicating that the user can use each of the plurality of functions, and if there is a function which is not available to the user authenticated by the authenticating unit, cause the display unit to display manual information including an operating screen indicating that the user cannot use the function which is not available to the user.

6. The image processing apparatus according to claim 1, wherein the control unit causes, if there is no function which is not available to the user, the display unit to display manual information including an operating screen indicating that the user can use each of the plurality of functions, and if there is a function which is not available to the user, causes the display unit to display manual information including an operating screen where a displayed item corresponding to the function which is not available to the user is masked.

7. A control method for controlling an image processing apparatus which has a plurality of functions, comprising:
a display step of causing a display unit to display an operating screen operated by a user to use at least one of the plurality of functions and manual information related to the at least one of the plurality of functions; and
a control step of, if there is no function which is not available to the user, causing the display unit to display manual information including an operating screen indicating that the user can use each of the plurality of functions, and if there is a function which is not available to the user, cause the display unit to display manual information including an operating screen indicating that the user cannot use the function which is not available to the user.

8. The control method according to claim 7, further comprising
a storage step of storing, in a storage unit, screen information for generating an operating screen operated by the user to use at least one of the plurality of functions; and
a generating step of generating the operating screen included in the manual information in accordance with the screen information stored in the storage unit.

9. The control method according to claim 7, wherein the display unit is a touch panel unit.

10. The control method according to claim 8, wherein the control step causes the display unit to display the manual information, including the operating screen being reduced in size, based on the operating screen generated in the generating step.

11. The control method according to claim 7, further comprising
an authenticating step of authenticating the user, wherein the control step causes, if there is no function which is not available to the user authenticated by the authenticating step, the display unit to display manual information including an operating screen indicating that the user can use each of the plurality of functions, and if there is a function which is not available to the user authenticated by the authenticating step, cause the display unit to display manual information including an operating screen indicating that the user cannot use the function which is not available to the user.

12. The control method according to claim 7, wherein the control step causes, if there is no function which is not available to the user, the display unit to display manual information including an operating screen indicating that the user can use each of the plurality of functions, and if there is a function which is not available to the user, causes the display unit to display manual information including an operating screen where a displayed item corresponding to the function which is not available to the user is masked.

13. A non-transitory computer-readable storage medium storing a program for causing a computer to execute a control method for controlling an image processing apparatus which has a plurality of functions, the method comprising;

a display step of causing a display unit to display an operating screen operated by a user to use at least one of the plurality of functions and manual information related to the at least one of the plurality of functions; and a control step of, if there is no function which is not available to the user, causing the display unit to display manual information including an operating screen indicating that the user can use each of the plurality of functions, and if there is a function which is not available to the user, cause the display unit to display manual information including an operating screen indicating that the user cannot use the function which is not available to the user.

* * * * *